United States Patent [19]

Holy et al.

[11] Patent Number: 4,626,149
[45] Date of Patent: Dec. 2, 1986

[54] ROTATING TOOLHEAD, ESPECIALLY FOR TURNING STATIONARY WORKPIECES

[75] Inventors: Franz Holy; Johann Eigner, both of Stockerau, Austria

[73] Assignee: Machinefabrik Heid Aktiengesellschaft, Vienna, Austria

[21] Appl. No.: 680,388

[22] Filed: Dec. 11, 1984

[30] Foreign Application Priority Data

Dec. 13, 1983 [AT] Austria ................ 4330/83

[51] Int. Cl.⁴ .............................................. B23B 3/26
[52] U.S. Cl. .................................... 409/191; 82/1.2; 82/2 E; 408/42; 408/153; 408/179
[58] Field of Search ............... 82/1.4, 1.5, 2 E, 1.2, 82/2 A; 408/22, 23, 24, 25, 147, 152, 153, 157, 179, 42, 161, 163, 172; 29/27 R, 27 A, 27 B, 27 C, 26 A, 563, 337; 409/183, 192, 190, 146

[56] References Cited

U.S. PATENT DOCUMENTS

| Re. 29,612 | 4/1978 | Fullerton | 82/36 A |
|---|---|---|---|
| 2,249,230 | 7/1941 | Schafer | 29/563 X |
| 2,404,433 | 7/1946 | Christman | 82/2 E |
| 2,486,977 | 11/1949 | Peters | 82/2 E |
| 2,826,928 | 3/1958 | Kearns | 82/2 E X |
| 4,250,778 | 2/1981 | Christoph | 82/2 A X |
| 4,345,860 | 8/1982 | Shashaty | 82/2 E X |
| 4,509,236 | 4/1985 | Morita et al. | 29/26 A |
| 4,573,380 | 3/1986 | Bald | 82/2 E X |
| 4,577,535 | 3/1986 | Klabonde et al. | 82/2 E |

FOREIGN PATENT DOCUMENTS 0060453 9/1982 European Pat. Off. ............ 82/2 E

Primary Examiner—Gil Weidenfeld
Assistant Examiner—Glenn L. Webb
Attorney, Agent, or Firm—Karl F. Ross; Herbert Dubno

[57] ABSTRACT

A rotating toolhead on a preferably longitudinally movable headstock of a machine tool is disclosed. The machine tool includes at least one head carriage radially movable on the toolhead with at least one toolholder on the carriage. A motor for advancing the head carriage is operatively connectable to a drive transmission, and an axially movable driver is associated with the drive transmission and engages a ring arranged rotation-fast and longitudinally movable on a main spindle. An angular drive transfer engages with inclined planar teeth in corresponding teeth of the head carriage for movement thereof. Several groups of toolheads are also disclosed which can be arranged to form a machining line.

7 Claims, 8 Drawing Figures

ROTATING TOOLHEAD, ESPECIALLY FOR TURNING STATIONARY WORKPIECES

FIELD OF THE INVENTION

Our present invention relates to rotating toolheads and, more particularly, to toolheads for the longitudinally movable headstock of a machine tool, wherein at least one radially movable head carriage with a toolholder is arranged in the toolhead so as to be movable in a radial direction, i.e. in a plane perpendicular to the axis of the workpiece and head.

BACKGROUND OF THE INVENTION

The machining of pipe ends of very long and out-of-round or similarly deformed workpieces, for example, pipes used in the oil industry (e.g. for drill strings), with machine tools in which the workpiece rotates while the tool is stationary, is generally associated with disadvantages because the workpieces tend to vibrate under rotation, and such vibration is difficult to control.

Accordingly, machine tools have been developed in which the workpiece is stationary and the tool, for example a lathe cutter of machining steel, is revolved or rotated about the workpiece.

Rotating toolheads are used for such machining and they are equipped in the manner of chuck assemblies in which the chuck jaws are replaced by radially movable head carriages to which the respective toolholder can be secured.

Toolheads can include only a single toolholder, but toolheads which utilize several toolholders are also known, and the radial movement of corresponding toolholders should be synchronized in these.

One known machine has a lengthy head carriage which is movable along a line which is diagonally disposed with respect to the toolhead, and the head carriage is equipped with a tool at each of its ends. The toolholders engage over the workpiece in the manner of forks. When the head carriage is moved in upward direction, the lower workpiece is engaged. When the head carriage is moved downwardly, the upper cutter steel is operative.

The kinematic configuration of the toolhead is complex because a radial advancing motion has to be imparted to the rotating component. The mechanism for this includes an axially movable rod which is arranged within the hollow main spindle. The rod cooperates with adjustment wedges which effect the radial movement of the head carriage. Such an arrangement is quite sufficient for simple machine tools. It is, however, of detriment that the hollow main spindle cannot be used for a rotating center or other alignment spindle or positioning device and it cannot be used for the supply of a cooling medium. Only a single adjustment or motion to the cutting tool (advance) can be transmitted for a synchronized group of tools.

OBJECTS OF THE INVENTION

It is therefore the principal object of the invention to provide an improved machine tool which substantially precludes the disadvantages of the prior art.

Another object of our invention is to provide an improved machine tool for the turning of stationary workpieces in which the control of the cutter is more precise than has heretofore been the case.

Another object of the invention is to prvide a machine tool for the purposes described which can be equipped with a plurality of essentially coupled cutters simultaneously engageable with a workpiece and in separate individually controllable sets or groups.

It is still another object of this invention to provide a machine tool which allows control of the cutter with minimum or zero play.

It is another object of our invention to provide a machine tool of the type described that is practically amenable to numerical control.

SUMMARY OF THE INVENTION

These objects are attained in accordance with the invention in that a servo-motor, or similar actuator motor, is provided and this is connected, for advancement of the head carriage, via a transmission, or a gear belt drive, to at least two spindles. The spindles, for example, circulating ball-threaded spindles, extend parallel with respect to the main spindle, are angularly fixed with respect to location within the headstock; each circulating ball spindle or drive transmission has an axially movable driver which engages a ring arranged so as to be rotation-fast and longitudinally movable on the main spindle. A kinematic angle drive transfer mechanism, preferably a wedge or a bar or rod having an inclined-plane surface formed, for example by inclined planar threads or teeth engages in corresponding threads or teeth of the head carriage for moving it.

Accordingly, the hollow main spindle is available for a mandrel spindle sleeve or similar tail spindle or center, and/or for cooling purposes. The transfer of the advancing motion effected by the actuator motor, for example, via NC-control, is practically without play through the circulating ball thread drive transmission. The arrangement allows control of several groups of tools independently of one another. The power transfer is over a relatively short path. The support forces act on a large diameter due to the outer drive transmissions, whereby the entire arrangement is gaining rigidity.

It is advantageous when the driver, as a rotating entrainment combination, includes a ring which can be axially moved and includes an inner ring groove for rolling elements which engage in a further ring-groove of that ring which is arranged on the main spindle and rotates with the main spindle.

The arrangement is similar to that of a ball bearing whereby the outer ring is part of the driver, and the inner ring rotates with the main spindle and is keyed thereto for rotation with the spindle, but can be moved in axial direction along the spindle by the outer ring and the rolling element (balls).

In accordance with a preferred embodiment, the ring grooves have inclined runner surfaces for the rolling elements and form a four-point bearing. This allows a force transmission in the axial direction from a location-fixed spindle to a rotating ring, which transmission is substantially free of play. It will be possible to utilize cross-rolling bearings wherein the ring has V-shaped grooves, and in which the rollers or rolling elements alternatingly contact or run on the one groove-flank and on the other groove-flank. The transmission of the adjustment movement of the head carriage advances from the actuator motor to the spindle of the drive transmission, and this is advantageously done with transmissions which follow the actuator motor, and are comprised of a pinion and a ring gear which is arranged in concentric manner with respect to the main spindle and which is arranged or journaled so as to be able to rotate—in which ring gear engage, on the one hand, the drive-side pinion and the spur gears arranged on the spindles of the drive transmission.

Several head carriages can be controlled independently of each other. It is then of advantage that several groups are arranged in the headstock, and such groups include spindles with drive transmissions, and drivers, which spindles are driven by a separate, preferably NC-controlled, actuator motor with transmissions, or gear belt drives. The transmissions can include spindles of circulating ball thread drives or similar transmissions means, and for each group there is provided a separate ring, which ring is axially movable on the main spindle and - under connection to conical rods or bars and conical transmission means—respectively moves and-/or shifts, in the toolhead, a group of head carriages, each of which has a toolholder. The ring gears as well as the driver rings are parallel with respect to one another, and the spindles with the drive transmissions are arranged at a distance about the main spindle and without interference with respect to one another, whereby the wedging bars are passed with play through bores or similar passages of respective rings.

A particularly preferred arrangement includes in each group of spindles three spindles, and each group of head carriages is comprised of three head carriages with toolholders, which head carriages can be adjusted together. The driver rings are particularly well guided by three drive transmissions. The machining of a workpiece can be carried out with maximum precision by three tools which are disposed in an angle of 120° with respect to one another, because the cutting forces which act radially on the workpiece compensate each other. A one-sided loading of the workpiece does not occur, which loading would be absorbed only in part by the clamping, and which would lead to a deformation of the cantilevering end of the workpiece.

It is also preferred that the several toolheads are connected in a machining or similar treatment line, and ahead of the toolheads there will be arranged a movable clamping pallet or clamping plate for centered clamping of the workpieces. It is also contemplated by the invention that each toolhead exhibits a centering device, preferably two centering rods, which can be driven out from a headstock assembly and which can be moved into centering openings of the clamping pallet or plate.

Complex workpiece contours, for which a larger number of tools for machining would be required, can be produced rapidly and accurately.

More particularly, the invention provides a machine tool which has a main spindle rotatable in a headstock which can be axially shiftable to axially advance a plurality of cutters as they are rotated by rotation of the spindle to externally engage a fixed workpiece. The tool head carried by a rod of this hollow spindle which can be traversed by a coolant for the cutting operation or provided with a live center or other member engageable with the workpiece, is formed with a plurality of angularly equispaced radially extending guides for each group of tools to be individually and synchronously brought into engagement with the workpiece in a controlled manner.

Each of these guides receives a respective tool carriage or slide which is displaceable radially and upon which a tool holder carrying the individually cutting tool can be removably mounted.

According to the invention, for each group of such tools a respective motor is provided, preferably under numerical control, and each motor is connected by an appropriate transmission to a circulating ball threaded spindle arrangement fixed in the headstock, driven by the motor and having its axially displaceable member connected by a rolling coupling to axially displace a ring in the spindle which is connected in turn through an angle image-transfer mechanism to the respective tool slide to displace the latter.

BRIEF DESCRIPTION OF THE DRAWING

The above and other objects, features and advantages will become apparent from the following description, reference being made to the accompanying drawing, in which.

SPECIFIC DESCRIPTION

Figure 1:
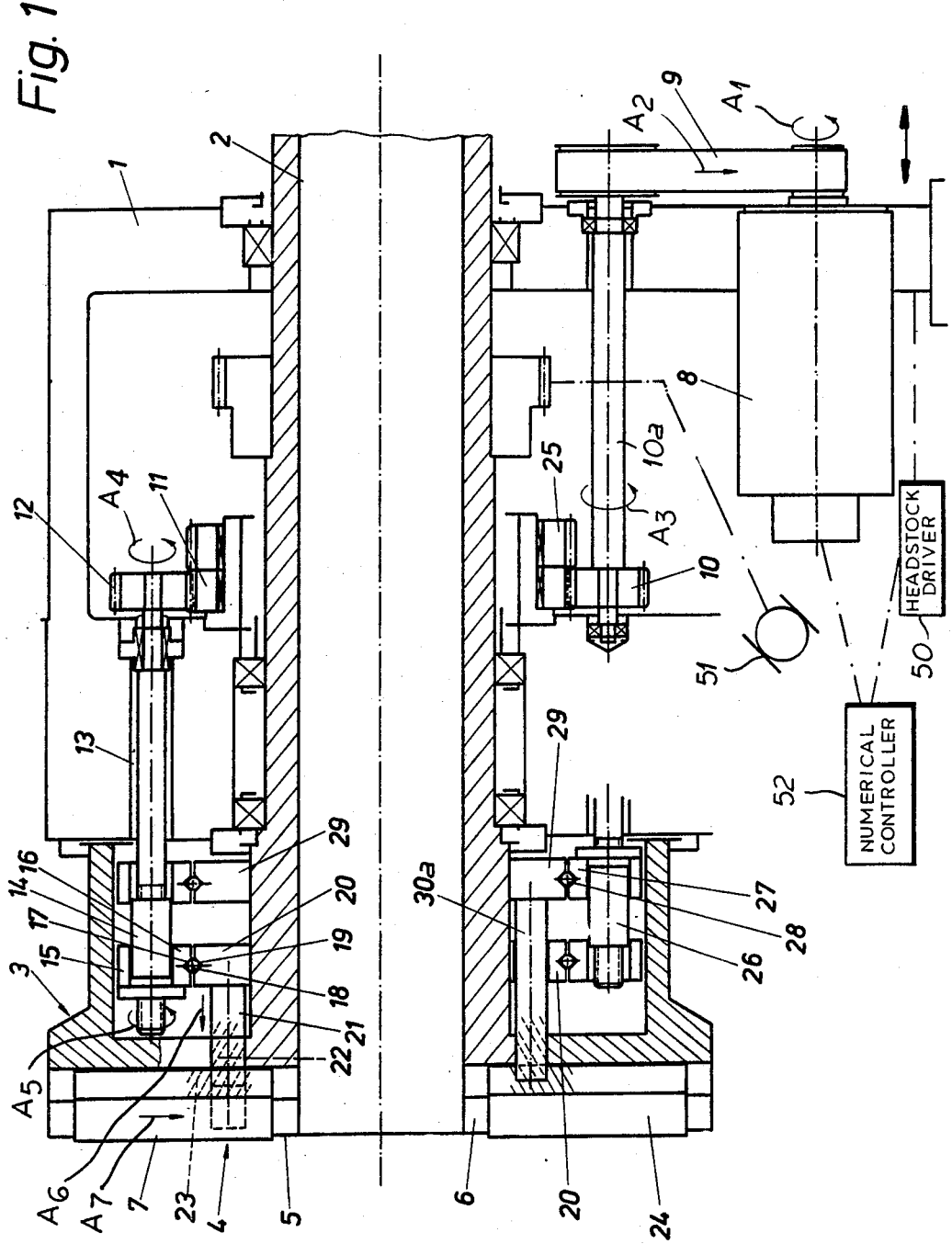
FIG. 1 is a schematic cross section of a toolhead in accordance with one embodiment of the invention.

FIG. 1 shows a headstock 1 which can be shifted in the longitudinal direction by the numerically controlled (NC) driver 50, and a hollow main spindle 2 is journaled in the headstock 1 so as to be free to rotate or revolve. The spindle 2 has its gear driven by the main motor 51 also operated under the control of the numerical controller 52.

Spindle 2 carries at its end which extends beyond the headstock 1, a toolhead 3. In the toolhead 3 there are provided at the end face 4 six radial guide grooves (see FIG. 3), which are respectively arranged at an angle of 60° with respect to one another.

A group of three arranged within an angle of 120° form a single group (triplet group). In the drawing plane in FIG. 1 are shown the guide groove 5 of the first triplet group and and the guide groove 6 of the second triplet group. In groove 5 as well as in the other two grooves of the first group, is respectively arranged one head slide or similar carriage 7, and each one of these is mounted so as to be radially shiftable, and they respectively carry a toolholder and tool.

The carriages of the group, or their tools, respectively, are synchronized to operate together. The radial advance or retraction for the first group of carriages 7 is achieved by an actuator motor 8. The transmission of motive power from the motor 8 which is arranged at the headstock 1 so as to be fixed with respect to location, to the rotating or revolving toolhead 3, requires measures which take into account not only the required highest precision, but also the selectively desired installation at the toolhead 3 of several groups of carriages which are independent of one another.

In accordance with the control signals of the NC unit 52, or similar computerized control system, the actuator motor 8, via a belt drive 9, steps a shaft 10a and a pinion 10. The pinion 10 engages ring gear 11 which is concentrically journaled on the headstock 1 with respect to the main spindle 2. Three spur gears, of which only spur gear 12 is shown, and which are respectively offset by 120°, transfer the rotation of the ring gear 11. The power transfer of motor 8 to the spur gears 12 can equally be accomplished by a toothed belt, gear belt, or a chain which, respectively, would engage the three spur gears, corresponding sprockets and the motor pinion, and surround the main spindle 2. The spur gears and the motor pinions must, of course, be arranged in a common plane perpendicular to the spindle in this arrangement.

The spur gear 12 is keyed on a spindle 13 of a circulating ball thread drive transmission 14 which includes balls or similar elements and correspondingly shaped grooves or threads. Such arrangement applies in an analogous manner with respect to the spur gears which are offset with respect to the spur gear 12. On the output side of drive transmission 14, a driver 15 is provided which is axially displaced by the circulating ball drives in accordance with the degree of rotation of the spindles 13.

The driver 15 includes a ring 16 which surrounds the main spindle 2. The ring 16 is furnished, in the manner similar to that of a ball bearing, with a groove 17 for balls 18. Groove 19 is provided, in turn, in a ring 20 which can rotate with the main spindle 2 and can be axially shifted on the main spindle 2. The grooves 17 and 19 are V-shaped and transfer axial movements via the balls 18. In this way, an axially directed adjusting movement is effected, substantially without play to the revolving ring 20, by the drive transmission 14 which is fixed with respect to location.

The ring 20 carries three connecting bars or wedge rods 21 which are offset at an angle of 120° with respect to one another, and each of the rods 21 is furnished at its end with inclined planar teeth 22. The respective carriage is equally provided with correspondingly inclined planar teeth or threads 23 which engage in and cooperate with the teeth or threads 22. This configuration is representative or the equivalent of an angularly disposed drive means, and the adjustment motion is transferred or bent as it were to the head carriage 7 of the first group.

The adjustment movement in one direction of rotation is continuously shown by direction indicating arrows starting from the shaft of the actuator 8 to the head carriage 7. (Arrows $A_1$ to $A_7$).

The head carriages 24 of the second group in the guide grooves 6 in the toolhead 3 are operated in an analogous manner by a further NC stepped actuator motor, not shown. This cooperates with a ring gear 25 which is connected in kinematic manner with three spur gears, spindles, and rotating drive transmissions with balls or similar spheres and corresponding grooves, hereinafter referred to as drive transmission, and one of these is shown at 26 in the lower half of FIG. 1. The three drivers associated with the drive assemblies again comprise an outer ring 27, balls 28 in grooves and a longitudinally shiftable inner ring 29. The inner ring 29 carries three connecting or conical rods. The shown connecting rod or bar 30a is disposed in the plane of the drawing and is passed with play through the ring 20.

By way of an angularly disposed or angle drive transfer (inclined teeth) the bar 30a synchronously shifts the shown head carriage 24 as well as the two which are not shown and which are disposed at an angle of 120° with respect to the one that is shown. The flow of motive power for adjustment of the two groups is done by way of two interconnected mechanically identically configured paths and without interference between such two assemblies.

As angular drive transfer (21, 22, 23) there may equally be used a rack or similar member with teeth, a pinion and a second rack adapted to cooperate with the rack, whereby the second rack extends at an angle of 90° with respect to the first rack. For movement of the driver rings 16 and 20, or 27 and 29, respectively, three spindles may be provided which are arranged at an angle of 120° and are furnished with drive transmissions similar to those shown at 14 or 26.

Figure 2:
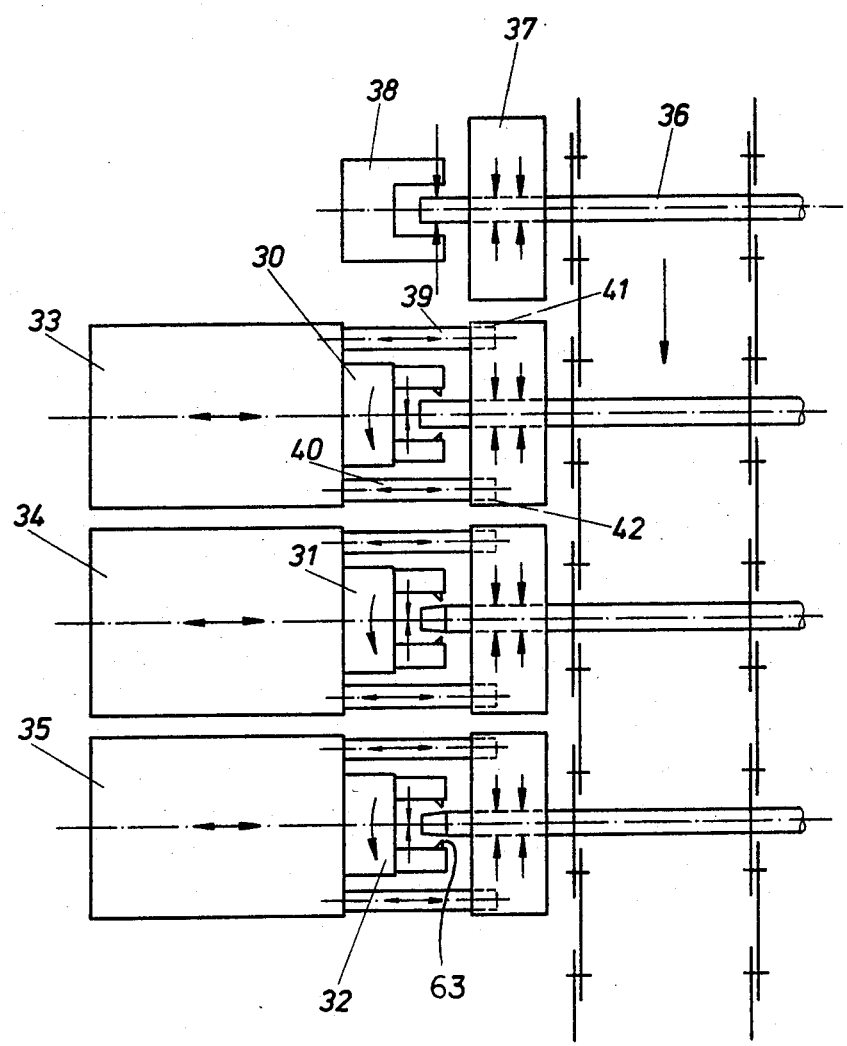
FIG. 2 is a schematic top plan view of a machining line.

FIG. 2 shows an arrangement, of three toolheads 30, 31 and 32 on independently from one another movable headstock assemblies 33, 34 and 35. In this configuration, which corresponds to a machining line or production line, the workpiece 36 is precisely set-up using the workpiece centering station 38. Each toolhead is provided with a centering device which is composed of centering rods 39 and 40. The clamping plate or pallet 37 is moved together with the workpiece 36 in front of the toolhead 30. The workpiece 36 and the plate or pallet 37 are exactly aligned by means of the rods 39 and 49, which are moved into the centering openings 41, 42 of the element 37. The headstock assembly 33 is advanced until the tools of the toolhead assembly 30 extend beyond the end of a workpiece 36, and the planar or transverse advancement movement during the machining operation is achieved by the assembly described in conjunction with FIG. 1.

When one wishes to achieve a reduction in the length of the toolhead 3 and nevertheless two groups of tool carriages are to be controlled substantially independently of one another, the driver of the second group with its ring 29 can be guided at the cylindrical inner housing wall of the housing of the toolhead so as to be rotation-fixed but shiftable in the longitudinal direction. The ring 29 is connected as described above, to connecting or conical bars 30a. The driver 15 is fashioned as shown in FIG. 1. The inner ring 20 of driver 15 is adapted to slide along the main spindle 2.

Figure 3:
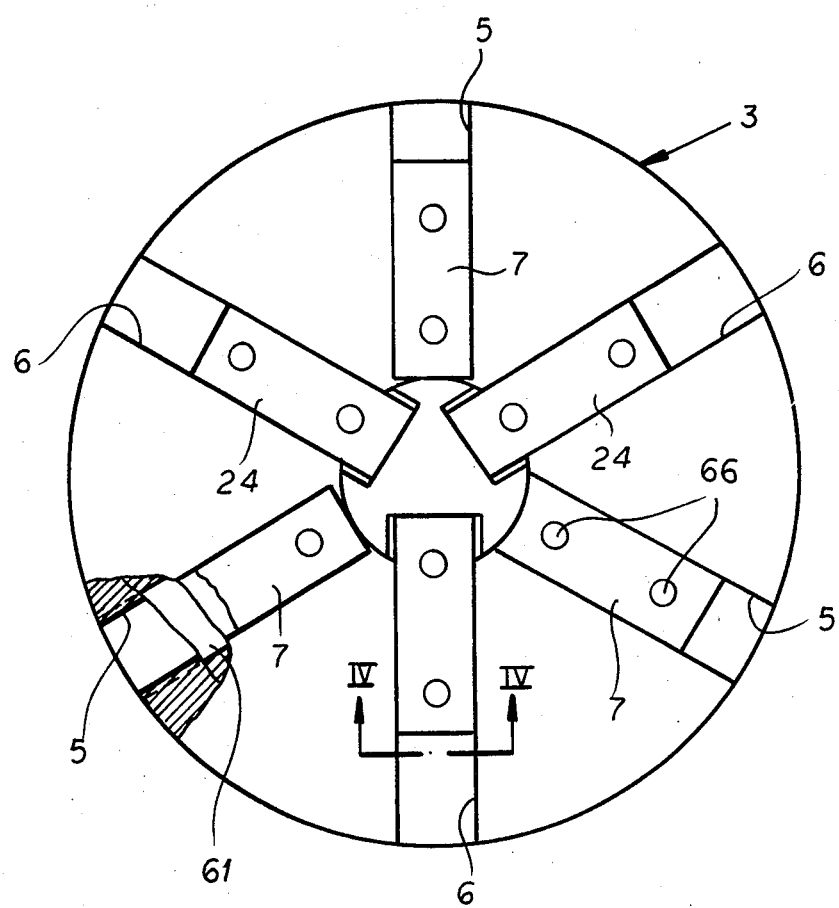
FIG. 3 is an end view of the tool head partly broken away and with the tool holders and tools removed, but showing the two groups of slides in different positions.
Figure 4:
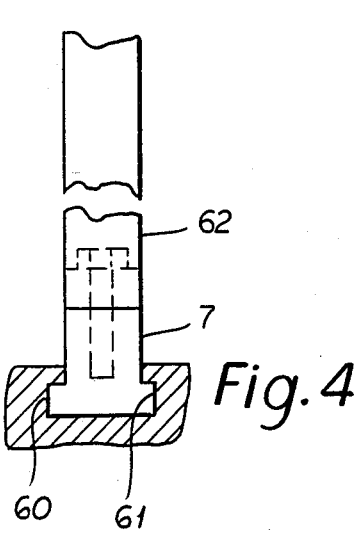
FIG. 4 is a fragmentary section along the lines IV—IV of FIG. 3 but with the tool holders in place.

From FIG. 3 it will be apparent that each slide 7 or 24 of the two groups of slides shown, can have a T-cross section (see FIG. 4) as well, with the cross bar 60 received in a widened portion 61 of the guide way formed by the slot 5 or 6. The tool holders 62 which, as can be seen from FIG. 2, can carry lathe-type cutting tools 63 at their ends, can have flanges 64 which are removable connected by bolts 65 engaging threaded bores 66 of the two slides.

Figure 5:
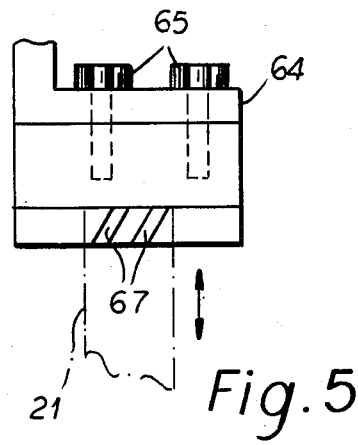
FIG. 5 is a view of a tool slide from the side showing the cooperation of a portion of the angle motion transfer device therefor.

Along at least one flank, the slide is provided with the inclined teeth 67 which were only diagrammatically represented at 23 and are engaged by complementary teeth not shown on the wedging bar 21 or 30 (FIG. 5) carried by the respective ring 20 or 29.

While the circulating ball threaded drive transmissions 14 have not been shown in detail in the drawing, since they are conventional in the art, it will be understood that they are of the type in which the spindle 13 is formed with a helical groove or track coupled to a nut having a helical groove or track and connected to the driver 15, a row of balls bridging the two grooves so as to preclude backlash between them. Balls leaving the track at one end are returned to the track at the other end via a passage in the assembly.

Figure 6:
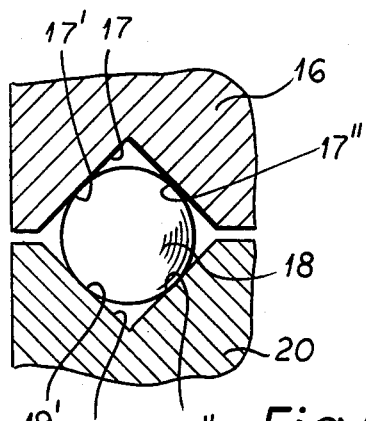
FIG. 6 is a detail view of the four-point system for transferring movement to the ring according to the invention.

In FIG. 6 we have shown the four-point system for transmitting the axial force of the driver 15 through the ring 16 to the ring 20. The V-section grooves 17 and 19 in the two rings have been shown in detail and are formed by flanks which are in point contact at 17', 17", 19', 19" with the balls 18.

Figure 7:
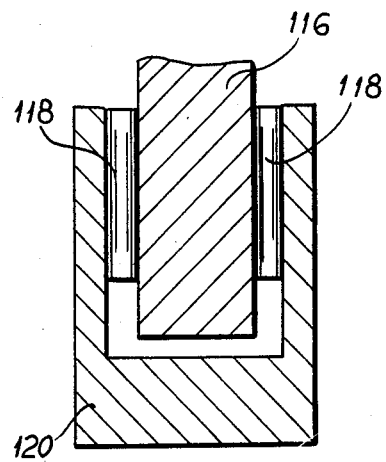
FIG. 7 is a diagrammatic section showing another device for transferring axial movement to the ring.
Figure 8:
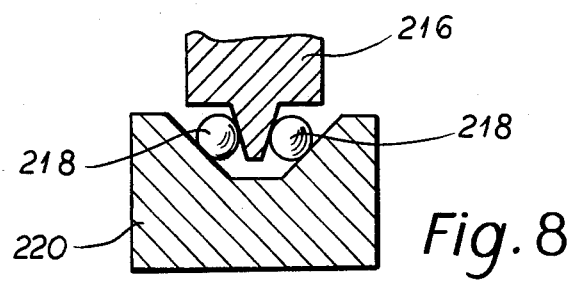
FIG. 8 is a view similar to FIG. 7 illustrating another embodiment of the invention.

FIG. 7 shows that a similar effect can be obtained when rollers 118 are provided between the ring 116 and the ring 120 in the form of roller thrust bearings shown only diagrammatically in FIG. 7. A cross bar arrangement is provided in FIG. 8 with two rows of balls 218 engaged between the ring 220 and the ring 216. The embodiments of FIGS. 7 and 8 are also used in the manner of the mechanism shown in FIG. 6 to transfer the axial movement of the driver 15 or the ring 27 to the ring 20 or the ring 29 as previously described.

We claim:

1. A machine tool for the turning of a fixed workpiece, comprising:
    a headstock;
    means for axially shifting said headstock relative to said workpiece in an axial direction thereof;
    a hollow main spindle rotatably journaled in said headstock;
    a toolhead mounted on said main spindle and formed with at least two groups of annularly equispaced guides;
    respective tool slides received in said guides and radially displaceable on said toolhead in corresponding groups, said slides being adapted to receive respective toolholders and respective cutting tools for turning said workpiece;
    respective motors assigned to each of said groups;
    respective transmissions connected to said motors and each including a plurality of angularly equispaced circulating ball threaded drives disposed at fixed locations in said headstock and having respective members axially displaced upon rotation of the respective motors;
    respective rings rotatable with said spindle and axially displaceable thereon and operatively connected with said members of the drives for each of said groups of slides; and
    respective angle motion translating mechanisms connecting each of said rings with the slides of the corresponding group so that all of the slides of each group are synchronously displaced upon axial movement of the ring.

2. The machine tool defined in claim 1 wherein each of said mechanisms includes an inclined formation on each of said slides and a wedging bar displaceable axially in the toolhead and having a complementary wedging formation engaging the formation on said slide for radially displacing said slide upon axial displacement of the respective bar, the bars of the slides of each group being connected to the respective ring.

3. The machine tool defined in claim 2 wherein the bars of one group of slides pass from the respective ring with clearance through the ring of the other group of slides.

4. The machine tool defined in claim 3 wherein each of said drives includes a respective transmission spindle formed with a spur gear, said transmissions including respective gears driven by said motors and meshing with respective ring gears of the drives of the respective group of slides.

5. The machine tool defined in claim 4 wherein each of said motors is a numeric control motor connected with a drive pinion meshing with a respective one of said ring gears.

6. The machine tool defined in claim 5 wherein each of said groups of slides and guides includes three gears and slides angularly equispaced at 120° about said axis.

7. The machine tool defined in claim 6 wherein each of said rings is axially displaced by the drivers of the respective group by a rolling coupling.

* * * * *